United States Patent
Mao et al.

(10) Patent No.: US 11,156,289 B2
(45) Date of Patent: Oct. 26, 2021

(54) TRANSMISSION SHELL, A TRANSMISSION CASE AND AN ACTUATOR

(71) Applicant: Johnson Electric International AG, Murten (CH)

(72) Inventors: Weixing Mao, Shenzhen (CN); Fan Ouyang, Shenzhen (CN); Chuan Liu, Shenzhen (CN); Long Yan, Shenzhen (CN); Ming Zhang, Shenzhen (CN); Zude Bai, Shenzhen (CN); Selvakumar Periyasamy, Chennai (IN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 97 days.

(21) Appl. No.: 16/393,641

(22) Filed: Apr. 24, 2019

(65) Prior Publication Data
US 2019/0323603 A1    Oct. 24, 2019

(30) Foreign Application Priority Data
Apr. 24, 2018  (CN) .......................... 201810377319.4

(51) Int. Cl.
*F16H 57/027*  (2012.01)
*F16H 63/30*   (2006.01)
*F16H 57/025*  (2012.01)

(52) U.S. Cl.
CPC ........... *F16H 63/30* (2013.01); *F16H 57/027* (2013.01); *F16H 57/025* (2013.01)

(58) Field of Classification Search
CPC .... F16H 57/027; F16H 57/031; F16H 57/039; F16H 1/16; F16H 57/025; H02K 5/10; H02K 7/116; H02K 7/1166; H02K 2205/09
See application file for complete search history.

(56) References Cited

U.S. PATENT DOCUMENTS

| | | | | |
|---|---|---|---|---|
| 5,650,677 A | * | 7/1997 | Furukawa | H02K 5/10 310/88 |
| 6,463,829 B2 | * | 10/2002 | Torii | H02K 5/10 74/425 |
| 2007/0295160 A1 | * | 12/2007 | Mizutani | E05F 15/697 74/606 R |

FOREIGN PATENT DOCUMENTS

| JP | 2007006617 A | * | 1/2007 |
|---|---|---|---|
| JP | 2011241863 A | * | 12/2011 |

* cited by examiner

*Primary Examiner* — Luis A Gonzalez
(74) *Attorney, Agent, or Firm* — Millman IP Inc.

(57) ABSTRACT

A transmission shell is applied to an actuator, and an accommodating space for receiving a transmission assembly is formed in the transmission case, the transmission shell is provided with a first ventilation structure, and the first ventilation structure includes a venting hole and a blocking wall disposed around the venting hole; the venting hole is in gas communication with the accommodating space; the blocking wall is disposed on an outer periphery of the venting hole to form a buffering chamber communicating with the venting hole, and an opening is provided at an end away from the venting hole. The present disclosure also provides a transmission case and an actuator using the above transmission shell. The venting hole is effectively waterproof and moisture-proof without requiring a sealing element, and are simple in structure, easy to manufacture, and low in cost.

16 Claims, 6 Drawing Sheets

TRANSMISSION SHELL, A TRANSMISSION CASE AND AN ACTUATOR

CROSS REFERENCE TO RELATED APPLICATIONS

This non-provisional patent application claims priority under 35 U.S.C. § 119(a) from Patent Application No. 201810377319.4 filed in The People's Republic of China on Apr. 24, 2018.

FIELD

The present disclosure relates to a transmission shell, and more particularly to a transmission shell having a venting hole, a transmission case having the transmission shell, and an actuator including the transmission case.

BACKGROUND

In a window lift mechanism of a vehicle, an actuator is generally included, the actuator including a motor and a transmission case connected to the motor. The transmission case includes a housing and a transmission assembly disposed within the housing. The transmission assembly includes conventional worm gears and multi-stage gear drives. The output shaft of the motor is connected to the transmission assembly, and the transmission assembly is further connected to the window lifting mechanism, so that the output torque of the motor is transmitted to the window lifting mechanism through the transmission assembly to drive the window to be lifted. When the gears in the housing are running, the motor will heat up due to work, and the internal gas expands. If the pressure is not released, high pressure will accumulate. When encountering a sudden temperature drop such as external rain, the internal gas of the motor shrinks sharply, eventually breaking through the "weak" position of somewhere, resulting in water inflow.

Therefore, there is a desire for an improved transmission case.

SUMMARY

Accordingly, in one aspect thereof, the present disclosure provides a transmission shell. The transmission shell is applied to an actuator, and an accommodating space for receiving a transmission assembly is formed in the transmission case, the transmission shell is provided with a first ventilation structure, and the first ventilation structure includes a venting hole and a blocking wall disposed around the venting hole; the venting hole is in gas communication with the accommodating space; the blocking wall is disposed on an outer periphery of the venting hole to form a buffering chamber communicating with the venting hole, and an opening is provided at an end away from the venting hole.

Preferably, the first ventilation structure is integrally formed with the transmission shell.

Preferably, an end surface of the opening of the blocking wall is chamfered.

Preferably, the blocking wall is outwardly protruded from an outer surface of the transmission shell.

Preferably, a radial dimension of the buffering chamber is greater than a radial dimension of the venting hole.

Preferably, the blocking wall includes a first wall having a substantially arc shape and a second wall having a substantially L shape, and the second wall is connected to the first wall to form the buffering chamber.

Preferably, the second wall extends substantially in a direction parallel to the axial direction of the venting hole.

Preferably, the second wall includes a first portion extending from an outer surface of the transmission shell in a direction substantially perpendicular to an outer surface of the transmission shell, and a second portion connected between the first portion and the first wall.

Preferably, the second portion is substantially flat.

Preferably, an arcuate protrusion is formed from an inner surface to an outer surface of the second portion, and the direction in which the arcuate protrusion extends is the same as the direction in which the second portion extends.

Preferably, the buffering chamber ranges has a volume of 70 mm$^3$~6050 mm$^3$.

Preferably, the blocking wall has a thickness of 0.5 mm-3 mm.

Preferably, the transmission shell further including a second venting structure; the openings of the first ventilation structure and the second venting structure being oriented differently.

Preferably, the transmission shell includes a base and a cover that is disposed on the base, and a connection between the base and the cover is sealed.

In second aspect, the present disclosure provides a transmission case. The transmission case including: a transmission shell; a transmission assembly disposed in the transmission shell, the transmission assembly includes an output shaft extending out of the transmission shell, and a connection between the transmission shell and the output shaft is sealed.

In third aspect, the present disclosure provides an actuator. The actuator, including: a motor; a transmission case and the transmission case connected to a motor shaft of the motor, and a connection between the motor and the transmission shell is sealed.

In view of the foregoing, in present disclosure, the transmission shell can be waterproofed by introducing an air buffering chamber, and when the internal temperature of the motor rises, the expanded gas is discharged into the buffering chamber through the venting hole, so that the buffering chamber is filled with dry gas, and the external moisture can't enter the buffering chamber. When the motor cools, the air that is replenished is still the dry air in the buffering chamber, thus preventing the entry of moisture or water vapor. That is to say, this design realizes the pressure balance inside and outside the motor and avoids the entry of moisture or water vapor, thereby avoiding corrosion inside the motor. Meanwhile, the venting hole does not need to be provided with a sealing element, and can be effectively waterproof and moisture-proof. The structure is simple, easy to manufacture, and low in cost.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims. The figures are listed below.

FIG. 4 is a schematic view showing a mounting direction of the actuator shown in

FIG. 1;

DETAILED DESCRIPTION

Figure 1:
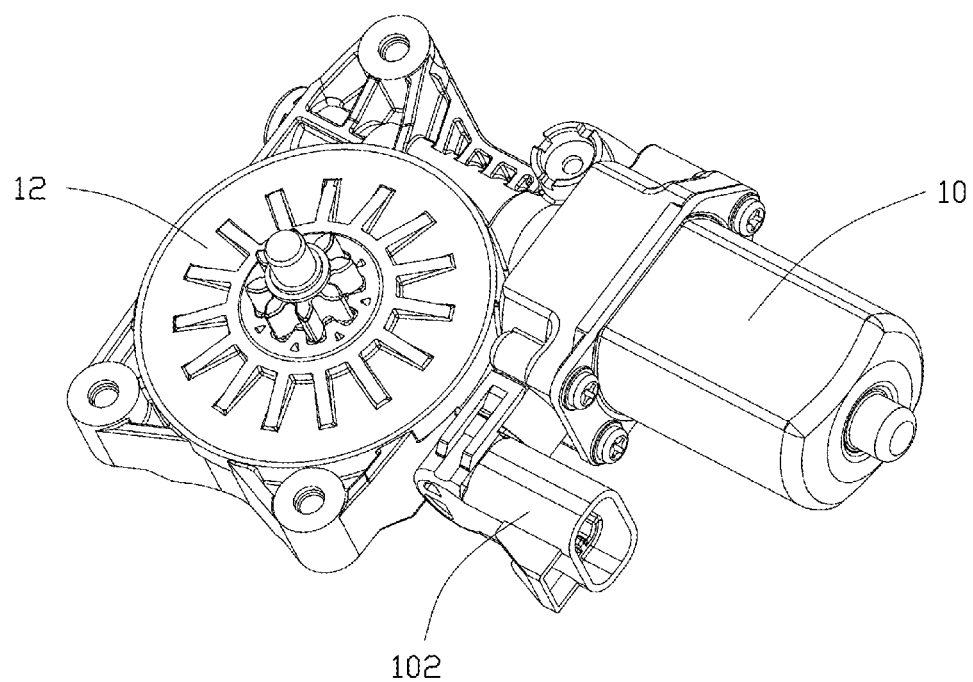
FIG. 1 is a view of an actuator according to an embodiment of the present disclosure.

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

It should be noted that when a component is referred to as being "fixed" to another component, it can be directly on the other component or the component can be in the middle. When a component is considered to "connect" another component, it can be directly connected to another component or possibly a central component. When a component is considered to be "disposed" on another component, it can be placed directly on another component or possibly with a centered component. The terms "vertical", "horizontal", "left", "right", and so on, as used herein, are for illustrative purposes only.

The present disclosure provides an actuator for driving a motion of a power mechanism, such as a power window system or a door closing mechanism of a vehicle. The actuator includes a motor and a transmission case connected to the motor, the a transmission case is used to transmit the power of the motor and increase an output torque by decelerating the rotation of the motor, thereby driving the object to move, for example, opening or closing the window, opening or closing the door, and so forth.

Figure 2:
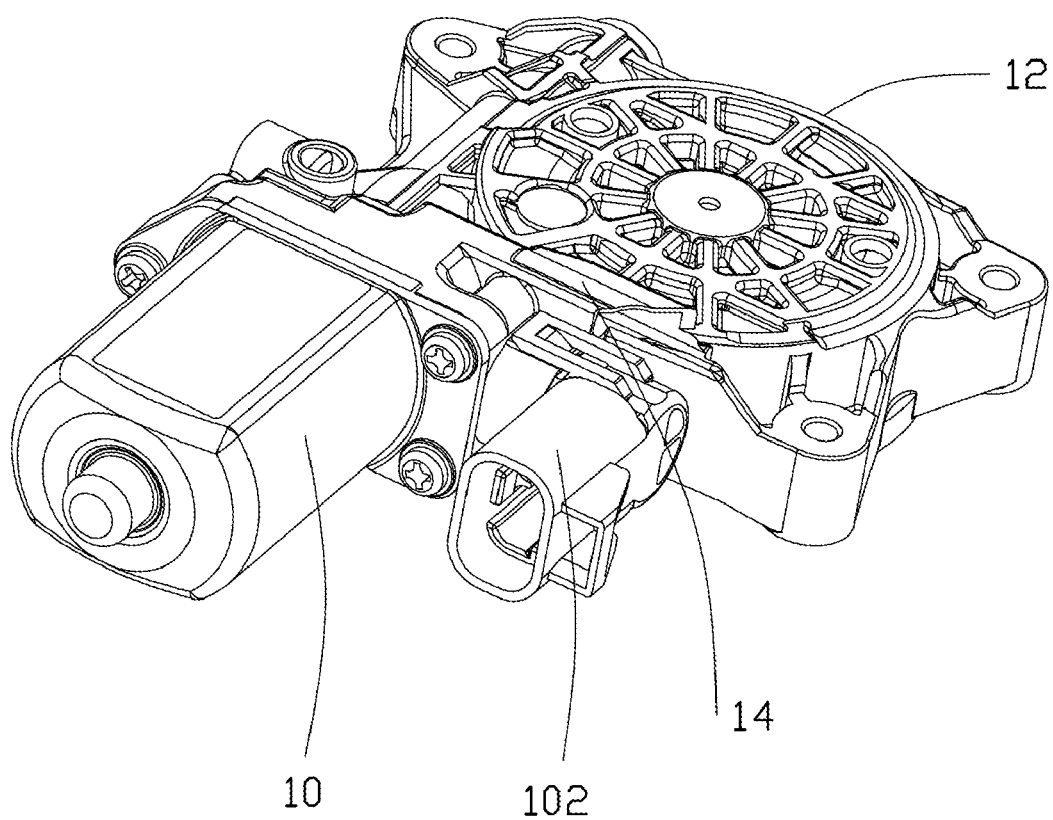
FIG. 2 is a view of the actuator of FIG. 1, viewed from another angle.

FIGS. 1 and 2 are views of an actuator with a transmission case according to an embodiment of the present disclosure. The actuator 1 includes a motor 10 and a transmission case 12 which is connected to the motor 10. The motor 10 provides a driving force in a rotational manner, and the transmission case 12 is used to reduce the rotation of the motor 10 and transmit the driving force of the motor for driving the load, such as, opening or closing the window, opening or closing the door, and so forth.

Figure 3:
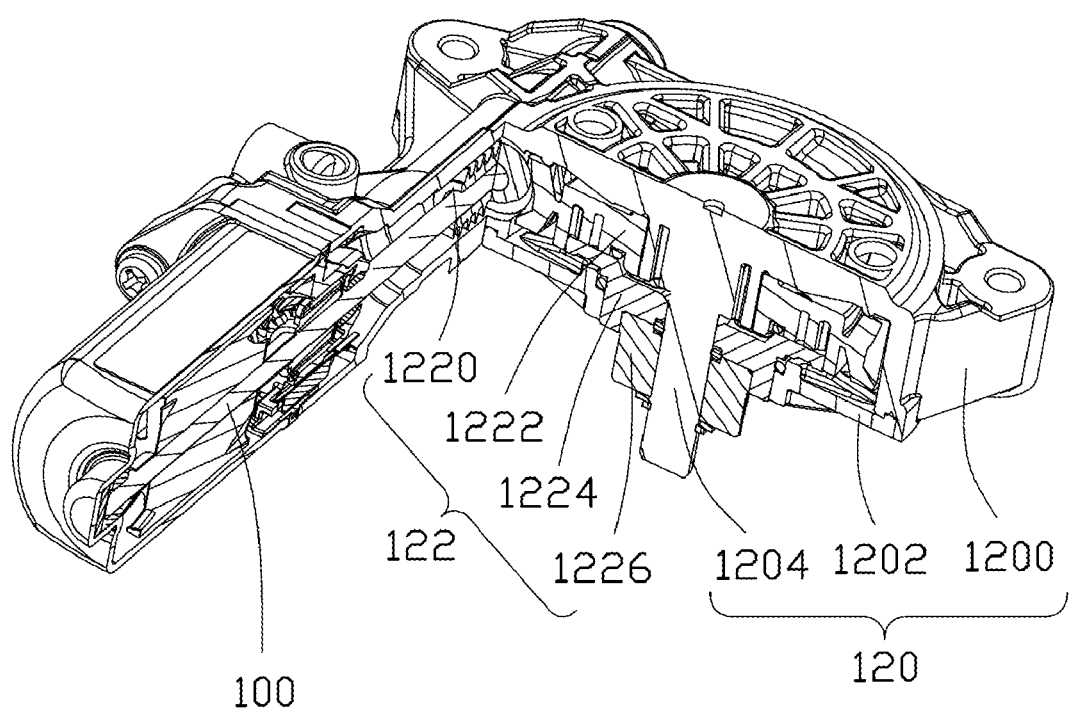
FIG. 3 is a partial cross-sectional view of the actuator shown in FIG. 1.

FIG. 3 is a partial cross-sectional view of an actuator 1 with a transmission case provided by an embodiment of the present invention. As shown in FIGS. 2 and 3, the motor 10 includes a motor shaft 100 and a connection portion 102 for connecting an external power source to supply power to the motor 10. The motor shaft 100 is rotatable and generates a certain torque when the motor 10 is turned on. The motor shaft 100 extends from one end of the motor 10 into the transmission case 12 and is rotatably supported in the transmission case 12.

The transmission case 12 includes a transmission shell 120 and a transmission assembly 122 disposed within the transmission shell 120. The transmission shell 120 includes a base 1200 and a cover 1202 that is disposed on the base 1200. The base 1200 and the cover 1202 together define an accommodating space for receiving the transmission assembly. The transmission assembly 122 includes a worm 1220 sleeved on the motor shaft 100, a worm wheel 1222 engaged with the worm 1220, and an output shaft 1226 fixed to the worm wheel 1222.

The accommodating space includes a first accommodating portion for accommodating the motor rotating shaft 100 and the worm 1220 sleeved on the motor rotating shaft 100, and a second accommodating portion for accommodating the worm wheel 1222 and the output shaft 1226. The first accommodating portion is connected to the second accommodating portion, so that the worm 1220 and the worm wheel 1222 can be engaged with each other.

The base 1200 is substantially square, and the first receiving portion is disposed at a portion of the base 1200 corresponding to the motor 10, and has a substantially cylindrical shape. The second receiving portion is disposed adjacent to the first receiving portion, and has a substantially flat cylindrical shape. The shape of the cover 1202 is adapted to the shape of the second receiving portion, and the second receiving portion is just covered to be fixedly connected to the base 1200. The cover 1202 and the base 1200 can be form-fitted, for example, the base 1200 is provided with an annular groove, and the cover 1202 is correspondingly provided with an annular flange, the annular flange cooperates with the annular groove to securely connect the cover 1202 with the base 1200. It can be understood that in other embodiments, the base 1200 and the cover 1202 can also be fixedly connected by any other suitable manner, such as by screwing, snapping, or fixing by screws, bolts, and so forth.

A fixed shaft 1204 is disposed at a center of the second receiving portion, and the fixed shaft 1204 can be fixed to the base 1200 by a fixed bearing. In some embodiments, the fixed shaft 1204 is integrally formed with the base 1200. An opening portion is provided at a center of the cover 1202. The fixing shaft 1204 extends from the opening portion to the outside of the accommodating space.

The worm wheel 1222 is substantially circular and has a shape adapted to the second receiving portion. The worm wheel 1222 is sleeved on the fixed shaft 1204 and is rotatable relative to the fixed shaft 1204. A through hole is positioned at a center of the worm wheel 1222 for receiving the output shaft 1226. The output shaft 1226 is fixedly connected to the worm wheel 1222 so as to be rotatable as the worm wheel 1222 rotates. The output shaft 1226 can be fixedly connected to the worm gear 1222 in a variety of suitable manners. In some embodiments, the output shaft 1226 can be secured in the through hole of the worm gear 1222 by a fixed bearing 1224. The fixed bearing 1224 can be fixedly connected to the worm wheel 1222 by means of interference, snapping, etc., and the fixed bearing 1224 and the output shaft 1226 can be fixedly connected by a form fit, a snap fit, an interference fit, and so on. For example, the outer peripheral wall of the output shaft 1226 is provided with at least one protrusion, and the fixed bearing 1224 is correspondingly provided with at least one groove, the protrusion cooperates with the groove to securely connect the output shaft 1226 with the fixed bearing 1224. The output shaft 1226 is sleeved on the fixed shaft 1204, the output shaft 1226, together with the fixed shaft 1204, extends from the opening of the cover 1202 to the outer side of the transmission shell 120.

In operation, the motor shaft 100 of the motor 10 rotates to drive the worm 1220 sleeved on the motor shaft 100 to rotate, and the rotation of the worm 1220 drives the worm wheel 1222 that meshes with the worm to rotate. The rotational force of 1222 is output through the output shaft 1226 to drive movement of the power mechanism connected to the output shaft, such as opening or closing of a window. The fixed shaft 1204 provides support for the rotation of the output shaft 1226.

The base 1200 of the transmission shell 120 and the cover 1202 are sealed, for example, by a sealing member such as a sealing ring to prevent water from entering the transmission shell 120 from the gap. The connection between the motor 10 and the transmission shell 120, the connection between the transmission shell 120 and the fixed bearing 1224 may be provided with a corresponding sealing element for sealing to prevent water from entering the motor 10 and the transmission shell 120 from the gap.

Figure 4:
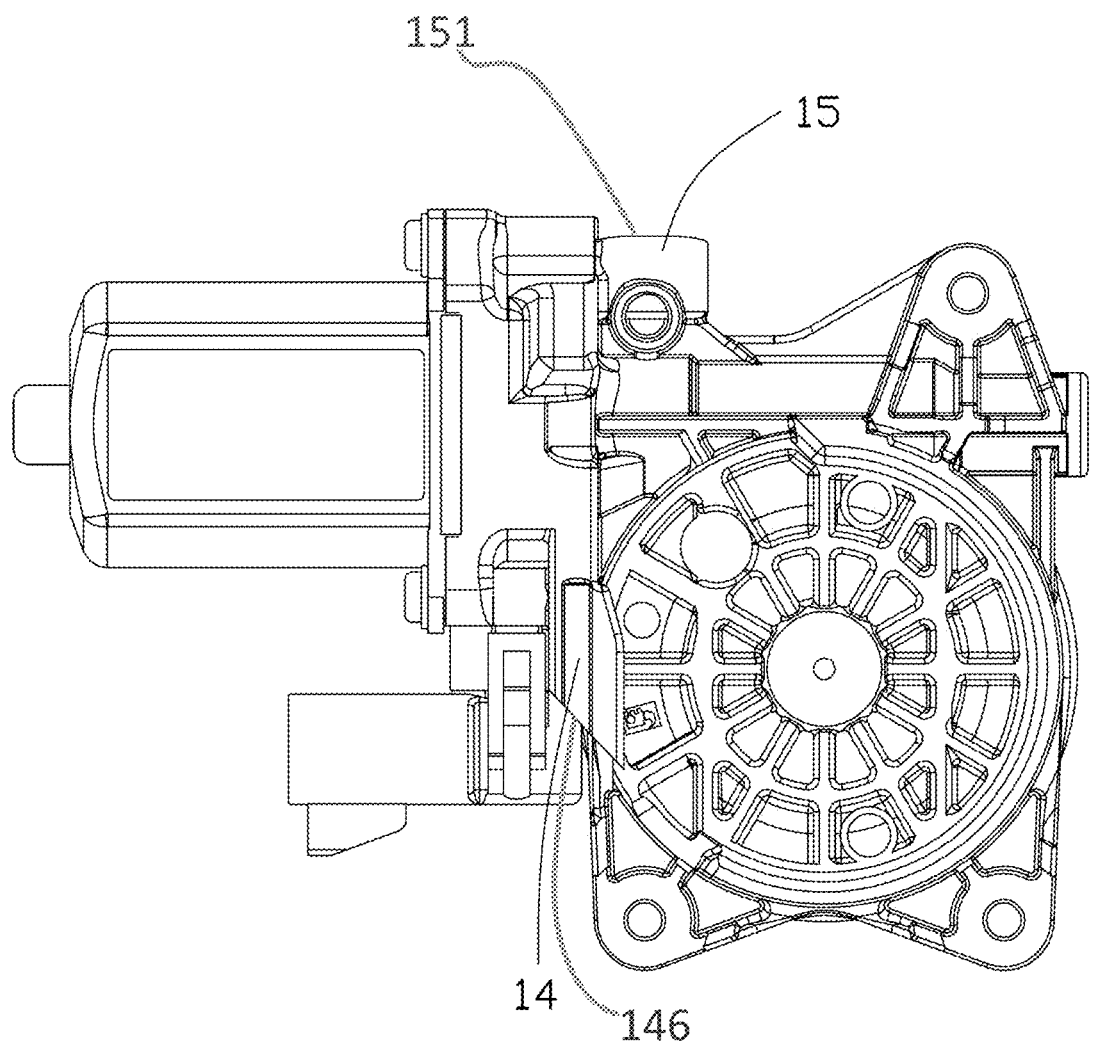
Figure 5:
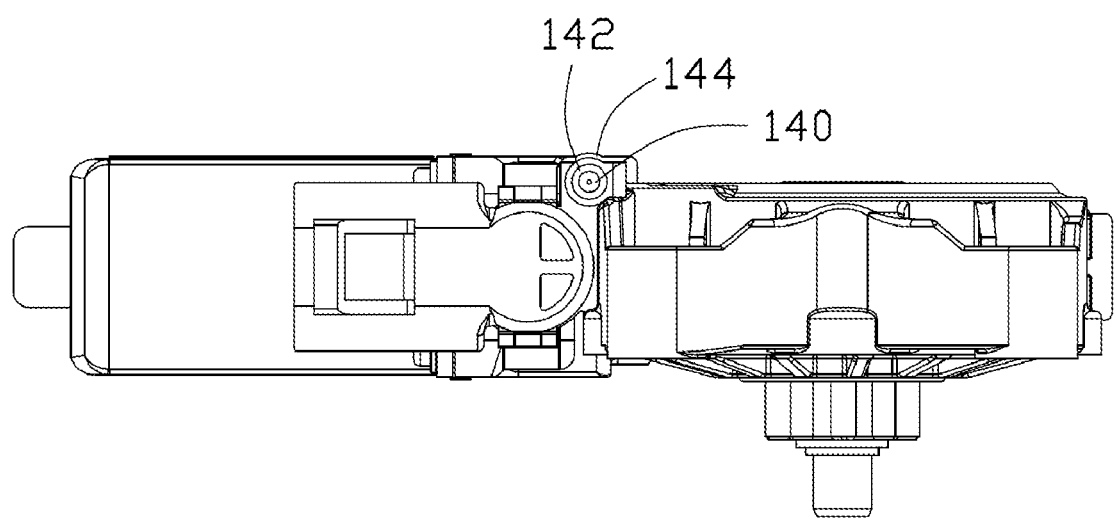
FIG. 5 is a view of the actuator of FIG. 1, with the first ventilation structure facing the first direction.
Figure 6:
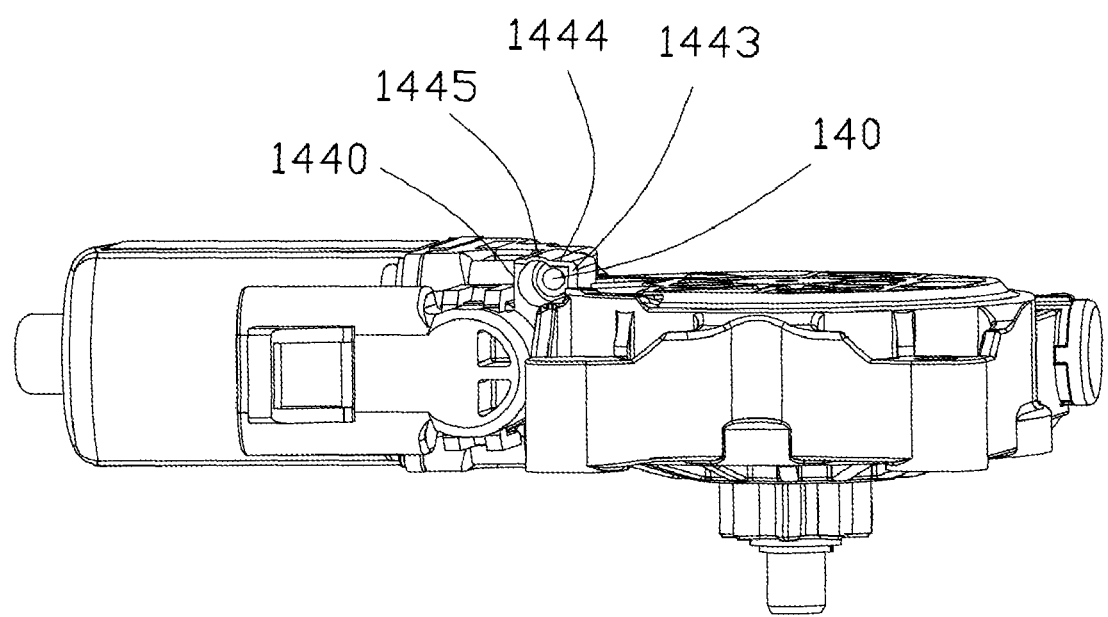
FIG. 6 is another view of the actuator of FIG. 1, with the first ventilation structure facing the second direction.

A first ventilation structure 14 (as shown in FIG. 2) is disposed on the transmission shell 120. A temperature change caused by heat generation inside the transmission shell 120 or cooling of the transmission shell causes a difference in air pressure between the inside and the outside of the transmission shell 120, and the first ventilation structure 14 is used for eliminating such a difference in air pressure by discharging or sucking in air. Referring to FIG. 4 through FIG. 6, the first ventilation structure 14 is disposed on the base 1200. The first ventilation structure 14 includes a venting hole 140 and a blocking wall 144 disposed around the venting hole 140. The venting hole 140 is in gas communication with the accommodating space formed by the base 1200 and the cover body 1202, so that the air pressure difference between the inside and the outside of the transmission shell 120 can be adjusted through the venting hole 140. The venting hole 140 are substantially circular in shape. It can be understood that in other embodiments, the venting hole 140 can be any suitable shape, such as an ellipse, a square, and so on. The venting hole 140 are formed by a venting hole wall 142. The venting hole wall 142 has a substantially cylindrical shape. The blocking wall 144 extends from the outer circumference of the venting hole wall 142 along the axial direction of the venting hole 140, and an opening 146 is provided at an end away from the venting hole 140. The blocking wall 144 is radially spaced from the outer periphery of the venting hole wall 142 by a distance, and the length of the blocking wall 144 in the axial direction is greater than the length of the venting hole wall 142 in the axial direction, thereby an air buffering chamber is formed between the inner side wall of the blocking wall 144 and the end surface of the venting hole wall 142. Since the blocking wall 144 is radially spaced from the outer periphery of the venting hole wall 142, the radial dimension of the buffering chamber is greater than the radial dimension of the venting hole. The blocking wall 144 can prevent water from directly entering the transmission shell 120 through the venting hole 140 during car washes or when it is raining.

In some embodiments, the first ventilation structure 14 is integrally formed with the transmission shell 120. The blocking wall 144 is outwardly protruded from the outer surface of the transmission shell 120, and the outer surface of the blocking wall 144 protrudes away from the outer surface of the transmission shell 120. The outer shape of the blocking wall 144 is streamlined to facilitate smooth flow of water through the outer surface of the blocking wall 144 to avoid water accumulation. It can be understood that the blocking wall 144 can also be disposed independently of the transmission shell 120 and detachably fixed to the transmission shell 120, and when the blocking wall 144 is fixed to the transmission shell 120, the blocking wall 144 is sealed with the fixing surface of the transmission shell 120.

More specifically, as shown in FIG. 6, the blocking wall 144 includes a first wall 1440 having a substantially arc shape and a second wall 1442 having a substantially L shape, and the second wall 1442 is connected to the first wall 1440 to form the buffering chamber. The first wall 1440 extends axially around the venting hole wall 142 of the venting hole 140, and the second wall 1442 extends in a direction substantially parallel to the direction in which the first wall 1440 extends. It can be understood that in other embodiments, the extending direction of the first wall 1440 and the second wall 1442 can also be off disposed from the axial direction, so that the radial dimension of the buffering chamber varies in the axial direction. For example, from the end face of the venting hole wall 142 toward the opening direction of the blocking wall 144, the radial dimension of the buffering chamber is larger and larger, forming a flared opening portion; or the radial dimension of the buffering chamber is getting smaller and smaller, forming an opening portion that gradually gathers.

The second wall 1442 includes a first portion 1443 extending from an outer surface of the transmission shell 120 in a direction substantially perpendicular to an outer surface of the transmission shell 120, and a second portion 1444 connected between the first portion and the first wall 1440. The second portion 1444 is substantially flat, such that the blocking wall 144 is more consistent with the appearance of the transmission shell 120. It can be understood that the second portion 1444 may not be flat, and may be, for example, an arc protruding in a direction away from the transmission shell 120, or the like.

An arcuate protrusion 1445 is formed from the inner surface to the outer surface of the second portion 1444, and the direction in which the arcuate protrusion 1445 extends is the same as the direction in which the second portion 1444 extends. The outer surface of the arcuate protrusion 1445 is higher than the outer surface of the other portion of the second portion 1444, which may further allow moisture flow through the outer surface of the transmission shell 120, thereby making it even more difficult to condense a water film on the end face of the blocking wall 144. It will be understood that in other embodiments a plurality of curved protrusions may also be provided.

As shown in FIG. 4, in some embodiments, when the actuator 1 is installed, the opening portion of the blocking wall 144 faces downward. Preferably, the opening portion of the blocking wall 144 faces downward in the plumb direction, that is, the venting hole 140 is located vertically above the opening portion of the blocking wall 144. Even if a part of the water enters the buffering chamber from the opening portion of the blocking wall 144, the water entering the buffering chamber quickly flows out of the buffering chamber due to its gravity and is difficult to flow to the venting hole 140. In some embodiments, the volume of the buffering chamber ranges from 70 mm$^3$~6050 mm$^3$, which can effectively prevent the buffering chamber from being quickly filled with water in an extreme case, giving the water a chance to reach the venting hole 140.

Due to the surface tension, water flows through the opening portion of the blocking wall 144 to easily form a water film, thereby impeding the balance of the air pressure inside and outside the transmission shell 120. Furthermore, once the transmission shell 120 is rapidly cooled due to water or the like, the internal air pressure suddenly drops, and it is easy to cause the water to be sucked into the transmission shell 120. In some embodiments, an end surface of the opening portion of the blocking wall 144 is chamfered, that is, the end surface of the opening portion of the blocking wall 144 is not at the same level. Thus, water flowing through the first ventilation structure 14 does not easily form a water film at the opening portion of the blocking wall 144 due to surface tension. It is assumed that even if the end surface of the blocking wall 144 is condensed into a water film, the condensed water flows from top to bottom under the action of gravity due to the chamfered structure. Therefore, under the combined action of different parts of the end face of the blocking wall 144, surface tension and gravity of the water, the tensile force experienced by the water film is different at different heights of the end face of the blocking wall 144, so that it is easily broken, and thus it is difficult for the condensed water film to continuously cover the opening portion of the blocking wall 144.

In some embodiments, the thickness of the blocking wall 144 can be uniform, such as from 0.5 mm-3 mm. It can be understood that in some embodiments, the thickness of the blocking wall 144 may also be non-uniform. The uneven thickness of the blocking wall can further reduce the possibility of condensation of the water film, because the different thickness of the blocking wall will cause the surface tension to be different, even if the water film is condensed, it is easy to rupture. In some embodiments, in order to meet the requirements of different mounting directions, the transmission shell 120 may be provided with two openings respectively facing the ventilation structure in different directions. For example, as shown in FIG. 4, the openings 146, 151 of the first ventilation structure 14 and the second venting structure 15 are respectively oriented in opposite directions. In use, in some embodiments, depending on the mounting direction, the ventilation structure with the opening facing downward is used for ventilation, and the ventilation structure opened in the other direction is sealed. It can be understood that, in other embodiments, depending on the mounting direction, the ventilation structure with the opening facing downward is sealed, and the ventilation structure opened in the other direction used for ventilation. In some embodiments, the structures of the two venting structures can be disposed to be the same or different. In some embodiments, the blocking wall 144 can be configured to be detachably disposed on the transmission shell 120 so as to be easily detachable to different venting holes.

In the description and claims of the present application, each of the verbs "comprise", "include" and "have", and variations thereof, are used in an inclusive sense, to specify the presence of the stated item or feature but do not preclude the presence of additional items or features.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

The embodiments described above are provided by way of example only, and various other modifications will be apparent to persons skilled in the field without departing from the scope of the disclosure as defined by the appended claims.

The invention claimed is:

1. A transmission shell is applied to an actuator, and an accommodating space for receiving a transmission assembly is formed in the transmission shell,
   wherein the transmission shell is provided with a first ventilation structure, and the first ventilation structure comprises a venting hole and a blocking wall disposed around the venting hole; the venting hole is in gas communication with the accommodating space; and the venting hole are formed by a venting hole wall, and the blocking wall extends from the outer periphery of the venting hole wall, and the blocking wall extends along the axial direction of the venting hole, and the blocking wall is radially spaced from the venting hole wall by a distance; the blocking wall is disposed on an outer periphery of the venting hole wall of the venting hole to form a buffering chamber communicating with the venting hole, and an opening is provided at an end away from the venting hole; and a length of the blocking wall in the axial direction is greater than a length of the venting hole wall in the axial direction, and the buffering chamber is formed between the blocking wall and an end surface of the venting hole wall.

2. The transmission shell according to claim 1, wherein the first ventilation structure is integrally formed with the transmission shell.

3. The transmission shell according to claim 1, wherein an end surface of the opening of the blocking wall is chamfered.

4. The transmission shell according to claim 1, wherein the blocking wall is outwardly protruded from an outer surface of the transmission shell.

5. The transmission shell according to claim 1, wherein a radial dimension of the buffering chamber is greater than a radial dimension of the venting hole.

6. The transmission shell according to claim 1, wherein the blocking wall includes a first wall having a substantially arc shape and a second wall having a substantially L shape, and the second wall is connected to the first wall to form the buffering chamber.

7. The transmission shell according to claim 6, wherein the second wall extends substantially in a direction parallel to the axial direction of the venting hole.

8. The transmission shell according to claim 6, wherein the second wall includes a first portion extending from an outer surface of the transmission shell in a direction substantially perpendicular to an outer surface of the transmission shell, and a second portion connected between the first portion and the first wall.

9. The transmission shell according to claim 8, wherein the second portion is substantially flat.

10. The transmission shell according to claim 8, wherein an arcuate protrusion is formed from an inner surface to an outer surface of the second portion, and the direction in which the arcuate protrusion extends is the same as the direction in which the second portion extends.

11. The transmission shell according to claim 1, wherein the buffering chamber ranges has a volume of 70 mm$^3$ 6050 mm$^3$.

12. The transmission shell according to claim 1, wherein the blocking wall has a thickness of 0.5 mm-3 mm.

13. The transmission shell according to claim 1, further comprising a second venting structure, and the second venting structure comprises an opening; the opening of the first ventilation structure and the opening of the second venting structure being oriented differently.

14. The transmission shell according to claim 1, wherein the transmission shell comprises a base and a cover that is disposed on the base, and a connection between the base and the cover is sealed.

15. A transmission case, comprising:
    the transmission shell according to claim 1;
    a transmission assembly disposed in the transmission shell, the transmission assembly comprises an output shaft extending out of the transmission shell, and a connection between the transmission shell and the output shaft is sealed.

16. An actuator, comprising:
    a motor;
    the transmission shell according to claim 15, and the transmission case connected to a motor shaft of the motor, and a connection between the motor and the transmission shell is sealed.

* * * * *